United States Patent
Foss

[15] 3,683,725
[45] Aug. 15, 1972

[54] TAPERING TOOL FOR FIBERGLASS PIPE

[72] Inventor: Rudolph G. Foss, 2641 E. 8th St., Tulsa, Okla. 74104

[22] Filed: Aug. 13, 1970

[21] Appl. No.: 63,366

[52] U.S. Cl. .................................82/4 C, 144/205
[51] Int. Cl. .............................................B23b 5/16
[58] Field of Search........................82/4 C; 144/205

[56] References Cited

UNITED STATES PATENTS

| | | | |
|---|---|---|---|
| 1,915,350 | 6/1933 | Anderson | 82/4 C |
| 3,229,555 | 1/1966 | Castles | 82/4 C |
| 2,351,217 | 6/1944 | Kopp | 82/4 C |
| 3,181,398 | 5/1965 | Rogers | 82/4 C |

*Primary Examiner*—Leonidas Vlachos
*Attorney*—Head & Johnson

[57] ABSTRACT

A tapering tool having an expandable collet over which the end of a fiberglass pipe is received incorporates a mechanism to lock an expandable collet in a fixed position to prevent same from expanding outwardly and becoming tightly wedged against the interior of the pipe during the cutting cycle. The tapering tool further includes a radially-fed cutter blade arrangement which progressively draws the cutter blade onto the pipe being tapered during the cutting operation.

7 Claims, 11 Drawing Figures

INVENTOR.
RUDOLPH G. FOSS
BY
Head & Johnson
ATTORNEYS

PATENTED AUG 15 1972 3,683,725

INVENTOR.
RUDOLPH G. FOSS
BY
*Head & Johnson*
ATTORNEYS

TAPERING TOOL FOR FIBERGLASS PIPE

BACKGROUND OF THE INVENTION

This invention relates to tapering tools, and more particularly to a tapering tool for putting a male taper on the end of a tubular article.

Pipe tapering tools have heretofore been manufactured and generally comprise a collet or mandrel to which is attached a head member perpendicular to and rotatable about the axis of the mandrel. The head member carries an elongated blade running parallel to the collet or mandrel. In operation, the end of a tubular object such as fiberglass pipe which is to be tapered is inserted over the collet and expanded such that it comes in contact with the inner wall of the pipe. The head portion of the tool is then rotated relative to the collet or the collet relative to the head portion to enable the cutter blade to cut a male taper on the exterior wall of the pipe.

One of the disadvantages of presently manufactured tapering tools is that when the collet is rotated relative to the head portion during the cutting cycle, the expandable collet continues to expand and becomes tightly wedged against the inner wall of the pipe thereby rendering removal of the pipe difficult.

Another disadvantage of presently manufactured tapering tools is that progressive feeding of the cutter tool onto the exterior wall of the pipe during the cutting operation must be done manually.

It is therefore an object of this invention to present a pipe tapering tool incorporating thereon means for locking the expandable collet in a fixed position to prevent wedging thereof against the inner wall of the pipe during the cutting operation.

It is a second object of this invention to present a pipe tapering tool incorporating mechanical means thereon for automatically progressively feeding the cutter blade thereof onto the exterior wall of the pipe during the cutting cycle.

SUMMARY OF THE INVENTION

Generally the invention comprises an expandable collet rotatably carried on a shaft which in turn is rotatably carried by a housing. A cutter blade assembly running substantially parallel to the collet is rotatable about the axis of the collet shaft. The collet is expandable by means of expander bushings threadedly received on the collet shaft such that rotation of the shaft causes longitudinal movement of the bushings to expand or contract the collet. An operable dog member interlocks the expander bushings to the shaft for common rotation thereby locking the expanded collet in a desired fixed position. The tapering tool further includes in one embodiment an automatic feeding mechanism for progressively feeding the cutter blade onto the exterior wall of the pipe to taper same.

DETAILED DESCRIPTION OF THE DRAWINGS

DETAILED DESCRIPTION OF THE PREFERRED EMBODIMENT

Figure 1:
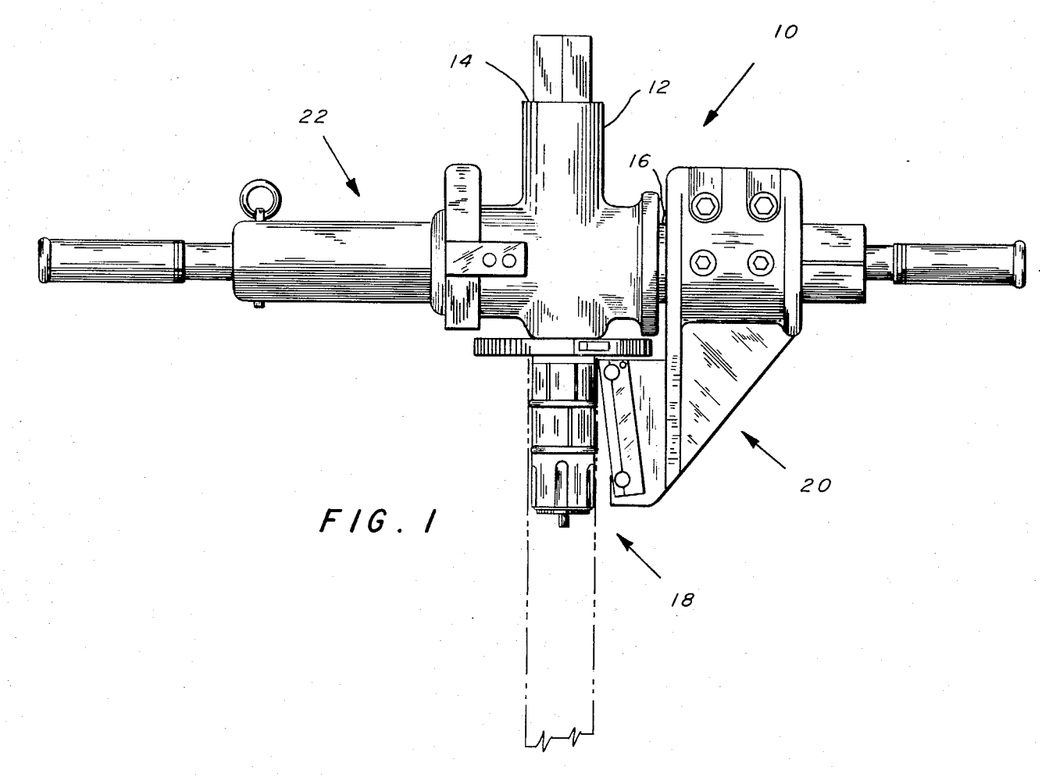
FIG. 1 is a side view of one embodiment of the tapering tool of this invention.

Looking now at FIG. 1 of the drawings there is shown a side view of the tapering tool of this invention generally denoted as 10. The tool 10 includes a housing 12 having mutually perpendicular ports 14 and 16. Port 14 rotatably carries a collet assembly 18 and port 16 carries a cutter blade assembly 20 which is rotated relative to the collet assembly by means of a radial driving assembly 22.

Figure 2:
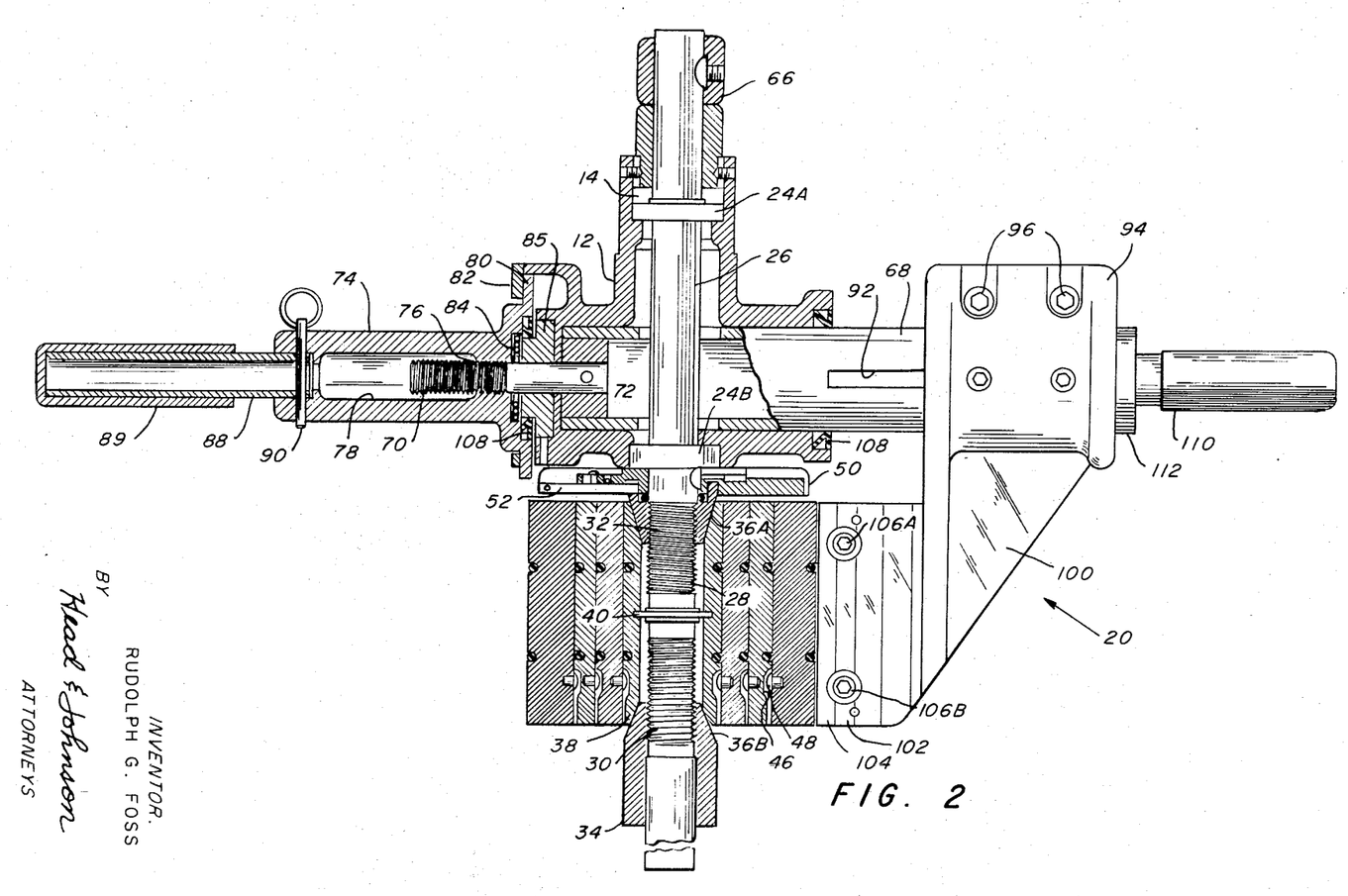
FIG. 2 is a partial cross-sectional view of the embodiment of the tapering tool shown in FIG. 1.

Turning now to FIG. 2 of the drawings, rotatably carried by housing 12 in longitudinal port 14 by means of bearings 24A and 24B is a collet shaft 26. Collet shaft 26 extends exteriorly outwardly from housing 12 and contains along the length thereof left-hand threads 28 and spaced apart therefrom right-hand threads 30. On each of the left-hand and right-hand threads 28 and 30 respectively are tubular collet expander bushings or cones 32 and 34. Each of the expander bushings 32 and 34 has inwardly and downwardly tapered confronting surfaces 36A and 36B around the periphery thereof. Sleeved over the collet shaft 26 and having outwardly and upwardly inclined surfaces at each end thereof mating with the inwardly and downwardly tapered surfaces 36A and 36B of the bushings is a tubular annular first collet 38 which is centered between respective expander bushings by means of a centering ring 40 having an inner diameter affixed to shaft 26 and an outer periphery received within a recess on first collet 38.

Figures 3, 3A, 4:
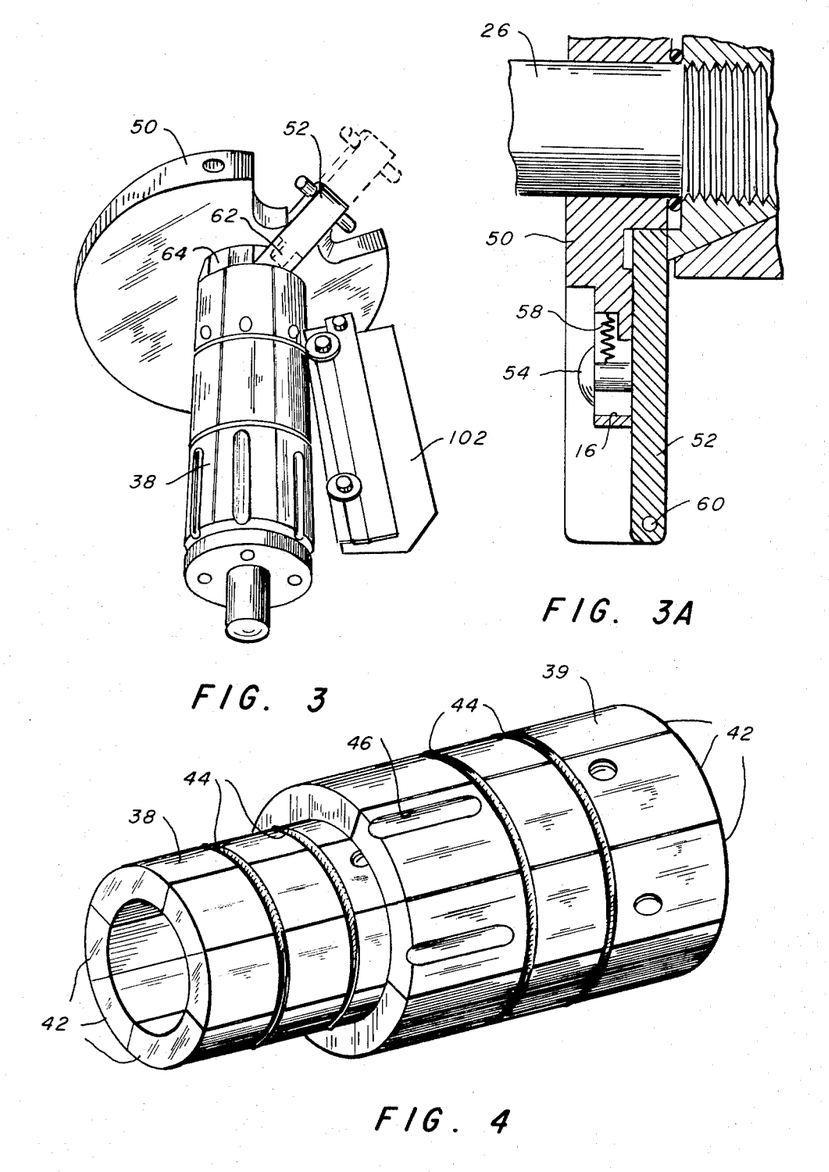
FIG. 3 is a perspective view of a portion of the tapering tool specifically showing the operation of the stop mechanism for locking the expandable collet in a preselected desired position.
FIG. 3A is an expanded cross-sectional view of a portion of the collet wheel of the tool showing in detail the stop mechanism.
FIG. 4 is a perspective view of expandable collets received one within the other in order to enable a single tool to be used on different O.D. pipe.

The O.D. of first collet 38 is slightly smaller than the I.D. of a certain size of pipe. As is shown in FIG. 4, a single tool can be adapted for use on different size O.D. pipe by progressively sleeving a larger O.D. collet 39 over first collet 38 to enlarge the O.D. of the composite collets to a dimension substantially commensurate with the diameter of the pipe to be tapered. Each collet is comprised of a plurality of longitudinal arcuate bars 42 held in a cylindrical configuration by elastic means such as O-rings 44.

Referring now back to FIG. 2, the individual collets are interlocked by means of at least one elongated groove 46 which is cut in the outer periphery of each collet and which receives a boss 48 projecting downwardly from the inner wall of the next succeeding collet.

Rotation of the collet shaft 26 causes expander bushings 32 and 34 to longitudinally travel on the shaft to either effect expansion or contraction of the collet depending on the direction of travel of the bushings. Affixed to collet shaft 38 intermediate expander bushings 32 and the end of housing 12 is a collet wheel 50 which facilitates the manual rotation of the collet shaft.

Looking now at FIG. 3A, an inwardly-outwardly traveling dog member 52 is retained on the collet wheel by means of a stud 54 working within an elongated slot 56 in the collet wheel. A spring 58 normally biases the dog member inwardly. A roll pin 60 facilitates the manual movement of the dog member.

Turning now to FIG. 3, dog member 52 includes on the inward end thereof a key portion 62 which is engageable in one of a plurality of recesses 64 cut in the rearward peripheral edge of expander bushing 32. When key portion 62 of dog member 52 is engaged in one of recesses 64, expander bushing 32 is interlocked to the collet wheel and collet shaft for common rotation therewith thereby retaining the expandable collet in a fixed position.

Referring back to FIG. 2, the end of shaft 20 opposite that carrying collet 38 also extends outwardly of housing 12 and receives a power drive adapter mandrel 66 for receiving an external power drive for rotating the collet shaft during the cutting cycle as is taught by one method of operation which will be subsequently discussed.

Slidably received within the upper portion of transverse port 16 within housing 12 is a tube member 68 having on the lower end thereof a coaxial downwardly extending threaded lead screw 70. Tube member 68 contains diametrically opposed elongated apertures 72 through which collet shaft 38 passes. The threads on lead screw 70 threadedly engage a threaded aperture 76 of a manual drive nut 74 and project into an elongated recess 78 therein. Manual drive nut 74 is rotatably secured to housing 12 by means of a lip surface 80 on the upper end thereof which rides on a horizontal flanged surface 82 on the lower end of housing 12. Thrust bearing 84 and thrust block 85 receive and absorb thrust forces during rotation of the drive nut. A handle 88 longitudinally affixed to the drive nut by means of a roll pin 90 at the lower end thereof provides a ready means for manual rotation of the drive nut. A suitable grip 89 may be inserted over the handle 88.

Looking now at the upper end of tube member 68, such contains a longitudinal elongated groove 92. Cutter blade attachment member 20 includes a head 94 which envelopes tube member 68 and is held thereon by means of bolts 96. Setscrews 98 passing through apertures in the head 94 and engaged in longitudinal grooves 92 prevent lateral movement of an arm 100 projecting outwardly from head 94 substantially parallel to the collets. Attached to arm 100 downwardly thereof is a cutter blade clamping member 102 to which is attached a cutter blade 104 adjacent the collets. Cutter blade 104 and clamping member 102 are attached to the arm 100 by means of two spaced-apart bolts 106A and 106B. Bolt 106A serves as a pivot while bolt 106B passes through an elongated slot in the arm portion 102 such that the blade can be pivoted through angles to vary the angle cut. Indicia means may be provided for visual determination of the angle of cut.

The attachment of the head of the cutter blade attachment member 20 to the tube member 68 by means of the groove and setscrew arrangement enables the cutter blade assembly to be longitudinally raised or lowered relative to the tube member 68 by the mere loosening and retightening of setscrews 98. Thus for smaller O.D. pipe, the cutter blade assembly and blade can be moved downwardly and when larger O.D. pipe is used requiring the addition of extra collets, the blade assembly can be moved upwardly relative to the tube member.

Dust seals 108 received in the upper and lower ends of port 16 guard against the entrance of dust and foreign material into the external portion of the tool.

Received on tubular member 68 upwardly of the head of the collet blade attachment member is a second handle 110 attached thereto by means of a handle adapter 112 in a manner known in the art.

OPERATION

The tool of this invention can be operated in a variety of ways, two of which will now be discussed. A first method of operation is to rotate the tool relative to the pipe to be tapered. As before mentioned, with small O.D. pipe a single collet may be all that is needed. However, for larger O.D. pipe a progressive number of collets are sleeved one over another such that the diameter of the ensuing collet periphery is slightly smaller than the I.D. of the pipe to be tapered. In operation the end of the pipe to be tapered is inserted over the collets. Once the pipe is inserted over the collets 38, collet wheel 50 is rotated to expand the collet outwardly such that the collet surface will grip the inner wall of the pipe but will not be tightly wedged thereagainst so that the collet supports and carries the pipe to prevent damage thereto. Key portion 62 of the dog member 52 is then inserted in one of the recesses 64 on the expander member 32 to interlock the expander bushings to the shaft for common rotation therewith thereby preventing further expansion of the collet 38. Cutter blade 104 is then set at the desired angle of cut upward and is drawn towards the outer wall of the pipe by the rotation of manual drive nut 74. The cutter blade is then rotated relative to the pipe by a twisting force by such means as an operator manually rotating the tapering tool 10 by using handles 89 and 110. Upon each revolution of the tapering tool the operator, by the manual rotation of drive nut 74, progressively draws the cutter blade onto the pipe to increase the length of the cut. The tool is rotated relative to the pipe until the desired length of taper is attained. When the cutting operation is completed, the blade is withdrawn from the pipe by reverse rotation of drive nut 74. Key portion 62 of dog member 52 is then withdrawn from recess 64 and the collet is contracted by reverse rotation of collet wheel 50. The pipe is then removed from the collet and the machine is ready for the next cutting operation.

Figures 8, 9, 10:
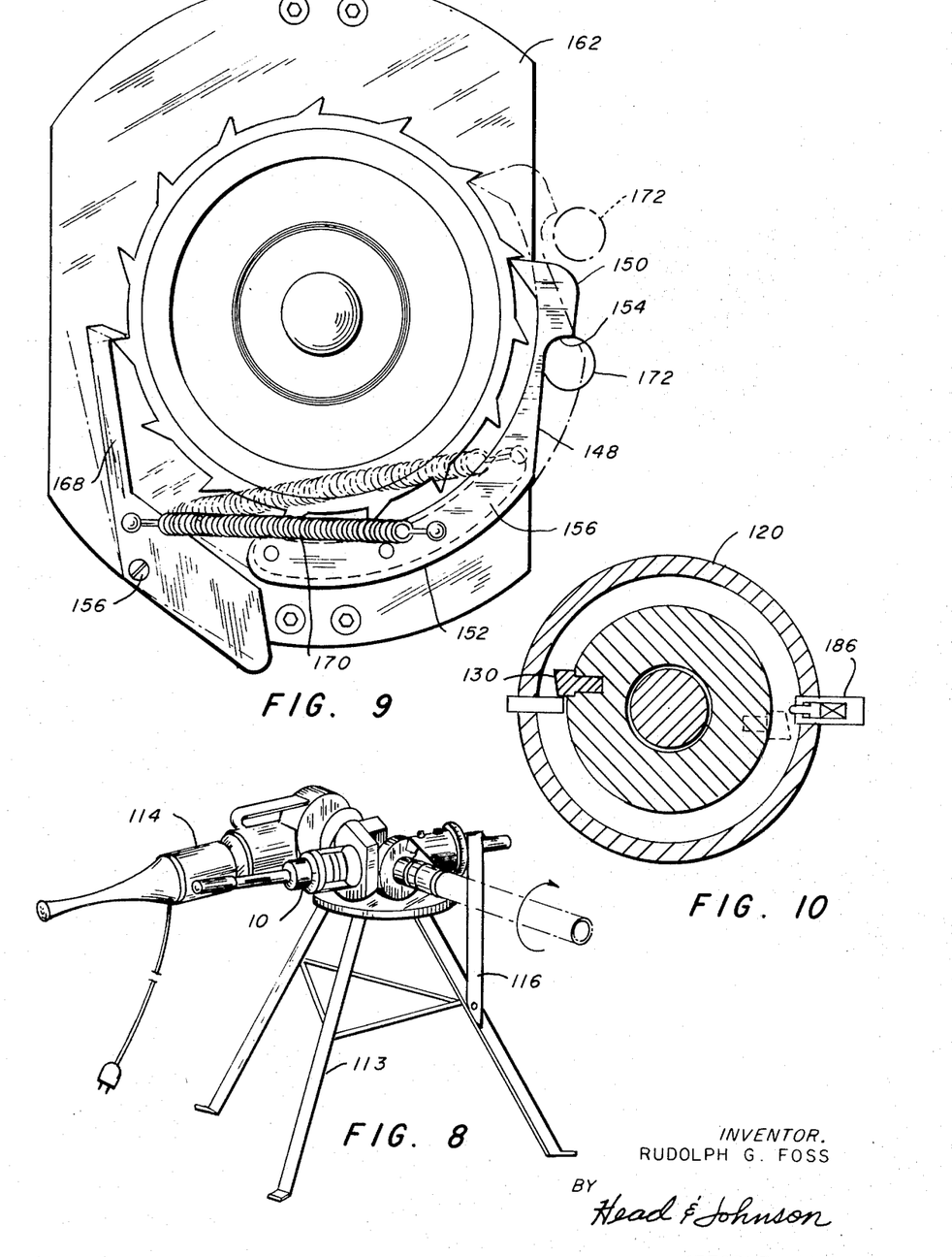
FIG. 8 is a perspective view of the tapering tool of this invention during operation thereof specifically showing the tool in combination with a stand and a power drive mechanism for rotating the pipe relative to the cutter blade.
FIG. 9 is a cross-sectional view taken along lines 9—9 of FIG. 5.
FIG. 10 is a cross-sectional view taken along lines 10—10 of FIG. 5.

In a second method of operation the pipe is rotated relative to the blade. The tool is mounted on a stud 113 and rotative power drive 114 such as shown in FIG. 8 is interconnected to the collet shaft 20 by being introduced over power drive adapter mandrel 66. Tapering tool 10 is held in the stationary fixed position by means of a bar 116 (see FIG. 8) having an eyelet through which is introduced handle 110. Once the pipe has been received over the collet and the collets expanded so as to support and carry the pipe to prevent damage thereto and expander bushing 32 interlocked to the collet wheel to prevent further expansion of the collets in the same manner as previously discussed; the power drive is energized to rotate the pipe. As the pipe rotates, the operator progressively draws the cutter blade 104 onto the pipe by manually manipulating drive nut 74 until the desired length of taper is obtained whereupon the pipe is removed in a manner as previously discussed.

As can be seen from the use of this method of operation, the feature of this invention of interlocking the expander bushing 32 to collet shaft 38 is of utmost importance as the collet is prevented from wedging tightly against the pipe, as would occur if the shaft were allowed to rotate relative to the bushings during the cutting operation.

ALTERNATE EMBODIMENT OF THE INVENTION

In both of the previously taught methods of operation, an operator was required to manually draw the cutter blade onto the pipe during the cutting operation. FIGS. 5, 6, 7, 9 and 10 illustrate an alternate embodiment of the tapering tool of this invention which incorporates in addition to manual blade feeding means a mechanically operable mechanism for automatic feeding of the blade onto the exterior wall of the pipe during the cutting operation.

Figures 5, 6, 7:
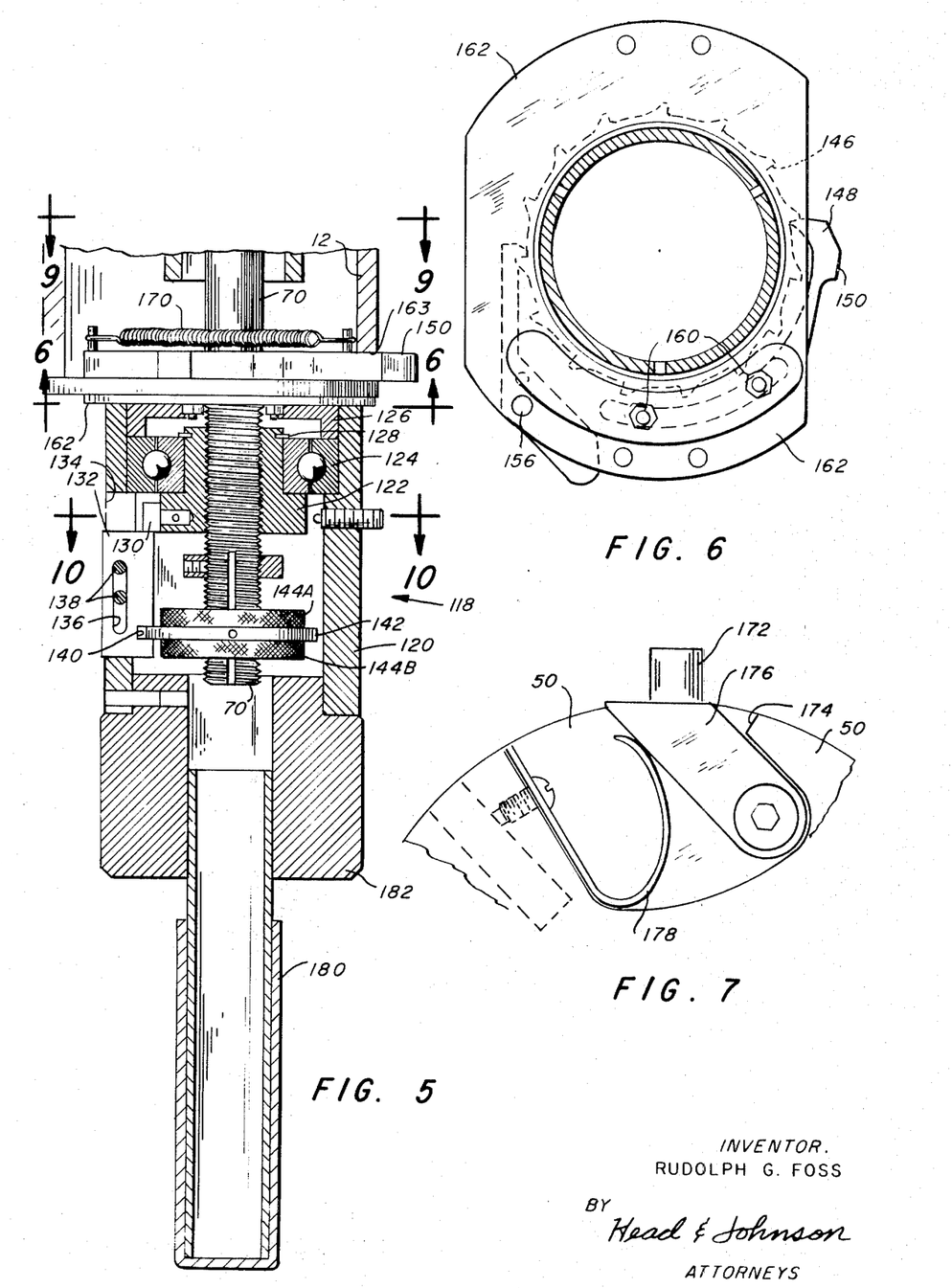
FIG. 5 is a cross-sectional view of an alternate embodiment of the tapering tool.
FIG. 6 is a cross-sectional view taken along lines 6—6 of FIG. 5.
FIG. 7 is a cross-sectional view of the apparatus taken along lines 7—7 of FIG. 2.

In this embodiment, an automatic driving mechanism 118 is attached to the housing member 12 in place of manual drive nut 74. Automatic driving mechanism 118 includes a tubular drive wheel 120 which rotatably supports on a thrust bearing 124 a lead screw nut 112. Lead screw nut engages lead screw 70 which as previously discussed projects downwardly from tubular member 68.

The lower surface of the ball thrust bearing 124 rides on a ridge surface formed in tubular drive wheel 120. A thrust spacer 126 on the upper surface of the thrust bearing retains the bearing in an axial position. Lead screw nut 122 is rotatably secured to the thrust bearing by having the inner surface of the bearing fitted between a horizontal flange surface on the screw nut at the lower end thereof and a retaining snap ring 128 received in a groove on the upper end of the lead screw nut.

Received on and extending horizontally outwardly from the periphery of a flanged surface on lead screw nut 122 is a strike pin 130 which operably engages an elongated drive plate 132 longitudinally slidably received in an elongated slot 134 in tubular drive wheel 120. Drive plate 132 in turn contains an elongated slot 136 through which roll pins 138 pass to interconnect the drive plate to the tubular casing to permit longitudinal movement of the plate relative to the casing. Drive plate 132 further includes on the inner lower edge thereof an open ended recess 140 which receives the peripheral edge of an adjusting lock plate 142 which in turn is carried on the lower end of lead screw 70 by being interposed between locking nuts 144A and 144B. Longitudinal movement of the locking nuts causes corresponding movement in drive plate 132 to adjust the position thereof relative to the strike pin 130.

Looking now at FIGS. 6 and 9, rigidly secured to the exterior periphery of the tubular drive wheel is a ratchet wheel 146 the teeth of which engage a drive pawl 148. Drive pawl 148 includes a head 150 and a shank 152. Head 150 includes on the exterior thereof a curved seating surface 154. A pair of spaced-apart studs 160 on shank 152 are slidably disposed within an elongated arcuate raceway 161 in a guard plate 162 to permit arcuate sliding movement of drive pawl 148. Clockwise arcuate movement of pawl 148 by engagement of the teeth of the ratchet wheel rotates tubular drive wheel 120. Pivotally attached to guard plate 162 at 156 and engaging the teeth of the ratchet wheel is a backlash pawl 160. Extending between the two ratchet pawls and connected on pins secured thereto is a coil spring 170 which biases drive pawl 148 in a counterclockwise position.

Guard plate 162 is attached to the lower end of housing 12 such that drive pawl 148, ratchet wheel 146 and backlash pawl 168 are enclosed by housing 12. Head 150 of drive pawl 148 projects exteriorly of housing 12 through slot 163.

Arcuate movement of drive pawl 148 to rotate tubular drive wheel 120 is accomplished by an annular cam follower 172 interconnected to collet wheel 50 as shown in FIG. 7 of the drawings. On the side confronting housing 12, collet wheel is recessed at 174. Pivotally received in recess 174 is a cam follower arm 176 which is normally forced by a spring cam arm leaf 178 against the ridge surface which defines recess 174. Annular cam follower 172 is affixed to the outer end of cam follower arm 176 and upon rotation of the collet wheel during the cutting operation engages the curved seating surface of head 150.

In operation, the end of the pipe to be tapered is inserted over the collet as previously discussed and the collet is expanded and locked by means of collet wheel 50 in the normal manner. The power drive is then inserted over the adapter mandrel 66 and the collet shaft, collet wheel and pipe are rotated relative to the cutter blade.

As shown in FIG. 9, as the collet wheel rotates, cam follower 172 engages curved seating surface 154 of head 150 causing arcuate movement thereof which in turn causes rotation of the tubular casing 120. When the pawl has moved through a certain arcuate distance, the cam slips away from head 150 and pawl spring 170 retracts pawl 148 thereby readying same for encounterment with the cam follower on the next revolution of the collet wheel. Meanwhile, backlash pawl 168 has engaged a tooth of the ratchet wheel to assure that tubular drive wheel 120 will not rotate in the counterclockwise direction.

Referring now back to FIG. 5, lead screw nut 122 is interconnected to tubular drive wheel 120 through engagement of strike pin 130 with drive plate 132. Thus lead screw nut 122 rotates in synchronism with drive wheel 120 thereby advancing lead screw 70 downwardly which results in the progressive drawing of cutter blade 104 onto the exterior wall of the pipe being tapered.

As lead screw 70 advances downwardly adjusting lock ring 142 carried by the lead screw slides drive plate 132 downwardly relative to strike pin 130 until the strike pin disengages the drive plate whereupon rotation of lead screw nut in unison with tubular drive wheel is abrogated and further drawing of the cutter blade 102 onto the exterior of the pipe is thwarted. The ability to alterably position drive plate 132 relative to strike pin 130 at the commencement of the cutting operation by longitudinal movement of adusting ring 142 on lead screw 70 incorporates in this embodiment a mechanical method of adjusting the length of the taper on the pipe.

A handle 180, secured to the lower end of tubular drive wheel 120 by a counterweight 182, enables an operator to rotate wheel 120 to manually draw the blade onto the pipe. Thus when power drive means are unavailable the tool of this embodiment can be used manually in a manner similar to those previously discussed.

At the end of the cutting operation, before the tapered end of the pipe can be removed from the collet, the cutter blade must be retracted therefrom in a manner such as is depicted in FIG. 10. A spring loaded return plunger 186 is received in the wall of tubular drive wheel 120. The outer surface of strike pin 130 is tapered such that upon clockwise movement of the wheel relative to the strike pin, the pin will depress the plunger and pass thereby. On the other hand upon counterclockwise movement of wheel 120 the pin will abut against the plunger interconnect lead screw nut 122 with the wheel for common rotation, thereby causing lead screw 70 to threadedly travel upwardly. The counterclockwise rotation of tubular drive wheel 120 is done manually through the use of handle 180.

The utility of having cam follower 172 pivotally attached to collet wheel 50 becomes evident when the collet wheel is reversely rotated to collapse the collet. If the cam follower were rigidly affixed to the collet, the tool would be damaged upon the cam follower engaging head 150 as both the head and the cam follower are immovable. However with the cam follower being pivotal, it can pivot downwardly to escape head 150 thereby permitting further rotation of the collet wheel without damage to the tool.

The previous description of the preferred embodiment shows that this invention teaches a tapering tool which is relatively lightweight, portable, and which can be easily used in field operations without difficulty.

During the detailed description of the preferred embodiments of the invention specific language has been used for the sake of clarity and such language is not to be construed as words of limitation, but includes equivalents which operate in a similar manner to accomplish a similar purpose.

What is claimed:

1. An apparatus for tapering the end of a tubular article comprising:
   a housing having bearings to rotatably support a collet assembly and having a cylindrical bore radial to the axis of said collet assembly to support a cutter assembly;
   said collet assembly including:
      a collet shaft possessing on a portion of the length thereof left-hand threads and on a second portion thereof right-hand threads,
      tubular collet expander bushings, having internal threads; one each threadedly received on said left and right-hand threaded portions of said collet shaft; said bushing being longitudinally travelable upon rotation of said shaft; said expander bushings having upwardly and outwardly inclined peripheral surfaces,
      an expandable collet sleeved over said expander bushings and adapted to receive the end of said tubular article; said collet, on the inner wall thereof, having inwardly and downwardly inclined surfaces mating with said upwardly and outwardly inclined surfaces on said expander bushings whereby longitudinal movement of said bushings effects diametrical expansion of said collect to retain said end of said tubular article, and
      means for locking at least one of said collet bushings to said collet shaft after said tubular article is retained and during the tapering operation;
   said cutter assembly including:
      a cylindrical tube member slidably received in said cylindrical bore, and axially movable in said bore,
      a cutter blade attachment member carried by said cylindrical tube member, and
      a cutter blade affixed to said cutter blade attachment member and extending substantially parallel to the axis of said collet assembly,
      means to cause relative rotation of said collet assembly to said cutter assembly to engage and taper the exterior end of said tubular article; and
      means engageable between said collet assembly and said cutter assembly at each revolution to axially move said tube member in said bore.

2. An apparatus as in claim 1:
   wherein at least one of said collet expander bushings has around a peripheral edge thereof a plurality of recesses;
   including a collet wheel affixed to said collet shaft for facilitating the rotation thereof; and
   wherein said means for locking said collet bushing to said collet shaft comprises:
   a dog member slidably received on said collet wheel, said dog member including a key portion insertable in one of said recesses on said collet expander bushing whereby said bushing is interlocked to said collet wheel and said collet shaft for common rotation therewith.

3. An apparatus as in claim 1 wherein said collet is comprised of a plurality of elongated arcuate bars retained in a cylindrical configuration by expandable means; each of said bars having at opposing ends inwardly-downwardly inclined surfaces mating with said inclined surfaces of expander bushings.

4. An apparatus as in claim 2 wherein said means to move said tube member in said bore comprises;
   an inwardly extending threaded lead screw attached to the inner end of said tube member;
   a driving nut rotatably carried by said housing and having female threads engaging said lead screw whereby upon rotation thereof in one direction, said blade attachment member and said blade is drawn toward the end of said tubular article received on said collet and upon rotation in the other direction said blade attachment member and blade is withdrawn from said tubular article and means responsive to rotation of said collet shaft with respect to said tube member for rotating said driving nut and advancing said tube member in said bore.

5. An apparatus as in claim 4 wherein said means for rotating said driving nut comprises; a ratchet wheel coaxially secured to the outer periphery of said driving nut; a drive pawl having a head engageable in the teeth of said ratchet wheel and a shank slidably interconnected to said housing; said pawl being normally biased in one direction;

means secured to said collet wheel and adapted to intermittently overcome the normal biasment of said pawl whereby upon rotation of said collet wheel said pawl oscillates about said ratchet wheel through an arcuate distance thereby rotating said driving nut relative to said lead screw to draw said cutter blade onto the outer wall of said end of said tubular article.

6. An apparatus for tapering the end of a tubular article comprising:

a housing;

a collet shaft rotatably carried by said housing; said shaft possessing on a portion of the length thereof left-hand threads and on a second portion thereof right-hand threads;

tubular collet expander bushings, having internal threads; one each threadedly received on said left and right-hand threaded portions of said collet shaft; said bushing being longitudinally travelable upon rotation of said shaft; said expander bushings having upwardly and outwardly inclined peripheral surfaces;

an expandable collet sleeved over said expander bushings; said collet on the inner wall thereof having inwardly and downwardly inclined surfaces mating with said upwardly and outwardly inclined surfaces on said expander bushings whereby longitudinal movement of said bushings effects diametrical expansion of said collet; said collet adapted to receive the end of said tubular article;

a cutter blade attachment member adjustably carried by said housing and rotatably about the axis of said collet shaft;

a cutter blade affixed to said cutter blade attachment member and extending substantially parallel to said collet; said blade adapted upon rotation of said cutter blade attachment to engage and taper the exterior wall of the end of said tubular article;

at least one of said expander bushings having around a peripheral edge thereof a plurality of recesses;

including a collet wheel affixed to said collet shaft for facilitating the rotation thereof; and a dog member slidably received on said collet wheel, said dog member including a key portion insertable in one of said recesses on said expander bushing whereby said bushing is interlocked to said collet wheel and said collet shaft for common rotation therewith.

7. An apparatus for tapering the end of a tubular article comprising:

a housing;

a collet shaft rotatably carried by said housing; said shaft possessing on a portion of the length thereof left-hand threads and on a second portion thereof right-hand threads;

tubular collet expander bushings, having internal threads; one each threadedly received on said left and right-hand threaded portions of said collet shaft; said bushing being longitudinally travelable upon rotation of said shaft; said expander bushings having upwardly and outwardly inclined peripheral surfaces;

an expandable collet sleeved over said expander bushings; said collet on the inner wall thereof having inwardly and downwardly inclined surfaces mating with said upwardly and outwardly inclined surfaces on said expander bushings whereby longitudinal movement of said bushings effects diametrical expansion of said collet; said collet adapted to receive the end of said tubular article;

means for locking said collet in a fixed position;

a cutter blade attachment member adjustably carried by said housing and rotatable about the axis of said collet shaft comprising;

a tubular member slidably disposed on said housing perpendicular to said collet shaft; said tube member at the upper end thereof receiving and carrying a blade attachment member and at the lower end thereof carrying a downwardly extending threaded lead screw;

a tubular drive wheel rotatably supported by said housing;

a lead screw nut rotatably carried by said tubular drive wheel and having a threaded aperture engaging said lead screw;

means for operably interconnecting said lead screw nut to said tubular drive wheel for common rotation therewith;

a ratchet wheel coaxially secured to the outer periphery of said tubular drive wheel;

a drive pawl having a head engageable in the teeth of said ratchet wheel and a shank slidably interconnected to said housing; said pawl being normally biased in one direction;

means secured to said collet wheel and adapted to intermittently overcome the normal biasment of said pawl whereby, upon rotation of said collet wheel, said pawl oscillates about said ratchet wheel through an arcuate distance whereby rotating said tubular drive wheel and said lead screw nut relative to said lead screw;

a cutter blade affixed to said cutter blade attachment member and extending substantially parallel to said collet; said blade adapted to engage and taper the exterior wall of the end of said tubular article; and power drive means for rotating said collet shaft relative to said cutter blade.

* * * * *